(12) United States Patent
Arlinghaus, Jr.

(10) Patent No.: US 7,255,126 B2
(45) Date of Patent: *Aug. 14, 2007

(54) SANITARY LIQUID PRESSURE REGULATOR

(76) Inventor: Joseph Wilfred Arlinghaus, Jr., 2822 Meigs La., Cincinnati, OH (US) 45233

( * ) Notice: Subject to any disclaimer, the term of this patent is extended or adjusted under 35 U.S.C. 154(b) by 281 days.

This patent is subject to a terminal disclaimer.

(21) Appl. No.: 10/978,843

(22) Filed: Nov. 1, 2004

(65) Prior Publication Data

US 2005/0056318 A1 Mar. 17, 2005

Related U.S. Application Data

(63) Continuation-in-part of application No. 10/402,480, filed on Mar. 28, 2003, now Pat. No. 6,929,026.

(51) Int. Cl.
G05D 16/02 (2006.01)
(52) U.S. Cl. ............. 137/495; 137/505.13; 137/505.18
(58) Field of Classification Search ................ 137/495, 137/505, 505.13, 505.14, 505.18, 494
See application file for complete search history.

(56) References Cited

U.S. PATENT DOCUMENTS 662,013 A 11/1900 Mueller (Continued)

OTHER PUBLICATIONS

Alfa Laval, Product Specification Sheet (2 pages): "CPM-I-D60 Constant-Pressure Modulating Valve (Inlet)", PD 61031 GB10, dated May 2001.

(Continued)

Primary Examiner—Stephen M. Hepperle

(74) Attorney, Agent, or Firm—Daniel F. Nesbitt; Hasse & Nesbitt LLC

(57) ABSTRACT

A liquid pressure reducing regulator having a pressure receiving means in liquid communication with the liquid inlet passage, upon which a liquid in the liquid inlet passage can exert a balancing force, and a means for communicating the balancing force to the diaphragm opposing an overpressure force exerted by the inlet liquid on the pressure control diaphragm. The liquid pressure regulator typically employs a balancing piston that can transfer pressure fluctuations in the flow outlet into an equal and opposite force on the valve plug, and results in a net force of zero in the diaphragm plate. As a result, changes in the liquid pressure downstream of the valve plug only nominally, and typically negligibly, affect the upstream control of the liquid product.

The invention also relates to a liquid pressure control valve having a liquid housing defining a liquid flow passage having a first flow passage, a second flow passage, and an orifice means intermediate between and providing communication between the first flow passage and the second flow passage, the orifice means having an opening, and a diaphragm assembly comprising a diaphragm having a liquid side forming a portion of the first flow passage, and an opposed control side, the diaphragm being moveable along a central axis. A control housing has a control means for applying a control force to the control side of the diaphragm. A valve plug is positioned proximate the opening of a valve orifice having a variable effective area as a function of the position of the valve plug. The valve plug has an opposed second side having a second surface in liquid communication with the second flow passage, where against a liquid in the second flow passage can exert a differential force against the diaphragm. The control valve has a pressure receiving means in liquid communication with the second flow passage, upon which a liquid in the second flow passage can exert a balancing force, and a means for communicating the balancing force to the diaphragm opposing the differential force.

21 Claims, 11 Drawing Sheets

U.S. PATENT DOCUMENTS

| | | |
|---|---|---|
| 970,284 A | 9/1910 | Wilkins |
| 1,050,036 A * | 1/1913 | Mueller ................. 137/505.18 |
| 2,788,192 A * | 4/1957 | Mountford ................. 251/63.5 |
| 2,941,543 A * | 6/1960 | Kleczek ................. 137/505.18 |
| 3,583,432 A | 6/1971 | Powell et al. |
| 3,730,215 A | 5/1973 | Conery et al. |
| 3,948,285 A | 4/1976 | Flynn |
| 4,208,031 A | 6/1980 | Jonak |
| 4,312,376 A | 1/1982 | Allen |
| 4,460,014 A | 7/1984 | Mases et al. |
| 5,070,901 A | 12/1991 | Black |
| 5,141,022 A | 8/1992 | Black |
| 5,492,146 A | 2/1996 | George et al. |
| 5,746,245 A | 5/1998 | Foster |
| 5,765,588 A * | 6/1998 | Katz ......................... 137/238 |
| 5,806,558 A | 9/1998 | Greverath |
| 5,829,473 A | 11/1998 | Hajbi et al. |
| 5,913,328 A | 6/1999 | Taube et al. |
| 6,056,008 A * | 5/2000 | Adams et al. ........... 137/487.5 |
| 6,186,163 B1 | 2/2001 | Borg |
| 6,371,156 B1 | 4/2002 | Walton et al. |

OTHER PUBLICATIONS

APV, Product Specification Sheet (15 pages): "Series CPV Constant Pressure Valve", dated Mar. 28, 2001.

Alfa Laval, Product Specification Sheet (4 pages): "CPM-2 Constant -Pressure Modulating Valve", PD 65394 GB5, dated Sep. 2000.

U.S. Appl. No. 10/402,480, Mar. 28, 2003, Arlinghaus, Jr.

* cited by examiner

SANITARY LIQUID PRESSURE REGULATOR

CROSS-REFERENCE TO RELATED APPLICATIONS

This application is a continuation-in-part application of non-provisional utility application U.S. Ser. No. 10/402,480, filed Mar. 28, 2003 now U.S. Pat. No. 6,929,026.

FIELD OF THE INVENTION

The present invention relates to liquid pressure reducing regulators and liquid pressure building regulators for the sanitary industry.

BACKGROUND OF THE INVENTION

The food, beverage, and biopharmaceutical industries, which can be collectively referred to as the sanitary industry, have special needs in the design of the liquid piping systems in manufacturing facilities, and in particular of automatic liquid flow and pressure control valves. The safety and purity of these sanitary products require that the liquid products be free from spoilage or contamination by outside agents, including cleaning solvents or solutions used during the system cleanout, and control fluids used during the manufacturing process. In the sanitary industry, the cleanability of a valve in a liquid piping system represents an important feature. Cleanability relates to the ability to thoroughly and effectively clean a valve in-place (i.e., without being physically removed from the piping system, also referred to as "CIP") with appropriate cleaning solvents or solutions, without leaving any residue or portion of the cleaning solvent, solution, or other liquid, such as water, used to rinse away the cleaning agents. Cleanable valves in the sanitary industry generally require that the cleaned valve be free of all residues and any portion of the cleaning or rinsing agents. The design of cleanable valves generally conforms to the following guidelines.

1. The valve body and fluid-contacting surfaces are made from solid materials and elastomers which resists corrosion from process fluids and cleaning chemicals, are typically, but not limited to, 316L stainless steel, 304 stainless steel, PVDF, TEFLON, EPDM, and Buna-N.

2. The valve body and fluid-contacting surfaces are made with smooth product contacting surfaces.

3. The valve body and fluid-contacting surfaces are made free from crevices or threads.

4. The valve body and fluid-contacting surfaces are made free from dead-legs or pockets.

5. The valve body and fluid-contacting surfaces are made completely drainable in the product-contacting area.

6. The valve body and fluid-contacting surfaces are made free from sharp corners, particularly inside corners, where product could accumulate.

7. The valve body and fluid-contacting surfaces are made with the ability to stroke the valve stem back and forth during clean-out in order to clean any dynamic O-rings, T-seals, or other sealing means, of residual product or cleaning agent which can later enter or leave the product contact areas during normal production.

These guidelines can be referred to as 3A guidelines 64-00(08-17N) for sanitary pressure regulators.

To a lesser extent, cleanable valve design also addresses the need to disassemble (e.g., by hand) the valve for hand cleaning of the product contacting areas without tools. Since most liquid flow valves are designed to be cleaned in-place using some form of automation, this guideline is sometimes relaxed. Cleanability is therefore an important distinction between a sanitary valve and a valve used in other industries.

Another important design criterion for a sanitary flow valve is the flow rate control or pressure control performance. The chemical processing operations used in the manufacture of most sanitary products are quite varied, and include filtrations, distillations, chemical reactions, separations, and others. The liquid components in such operations often require precise control of either one or more of the liquid properties, such as pressure, temperature, and flow rate. Consequently, there is an ongoing need in the sanitary industry for improved liquid flow control and fluid pressure control valves for the control of the liquid properties in the manufacture of sanitary products A liquid pressure building regulator valve of the prior art (FIG. 1 of U.S. Pat. No. 4,208,031) is shown in FIG. 10. Numerals shown in parentheses are those of the prior art valve of FIG. 10. The liquid pressure building regulator is connected into the piping of a typical process system to control the upstream liquid pressure at a selected setpoint, $P'_{up}$. A control fluid regulator (not shown) introduced via port (17) is set to maintain a controlling pressure, $P_{control}$, within the actuator space above the control diaphragm 6. Product liquid flows into inlet port (18), through the orifice, and out of port (19) at a downstream pressure $P_{down}$. When the upstream product pressure $P_{up}$ is at the desired set pressure, the regulator can operate at a steady state: that is, a state at which the valve plug (20) remains stationary at a position whereat a generally constant flow of liquid flows through the orifice, at a constant pressure differential across the orifice.

FIG. 11A shows a simplified cross-sectional view of a liquid pressure building regulator of the prior art of a valve plug and orifice. FIG. 11B is a chart of the liquid pressure of the product as it passes through the orifice of the regulator. Neither figure is drawn to scale. The figures show first that there is a significant total pressure drop between the inlet at position A having a pressure (P1) and the outlet at position D having a pressure (P3), and that the minimum pressure P2 at position B within the valve occurs within the valve orifice (between the valve plug and the seat). FIG. 11B shows that there is also a slight recovery in pressure from pressure P2 at position B to the downstream pressure P3 at position D. The pressure recovery is attributed to the significant turbulence within and just downstream of the valve orifice, where kinetic energy (liquid velocity) and potential energy (liquid pressure) are in transition. For the purpose of this invention, it can be assumed that the pressure P3' at position C pushing upward against the downstream-side of the valve plug is equal to the downstream pressure P3.

In the regulator valve of the prior art shown in FIG. 10, the effective liquid-side area of the diaphragm assembly ($A_{LS}$) that is exposed to upstream liquid pressure is equal to the area of the product diaphragm (5) minus the area of the valve plug (20) where $D_5$ is the diameter of the diaphragm (5) and $D_{20}$ is the diameter of the valve plug (20):

$$A_{LS}=(D_5^2-D_{20}^2)*\pi/4. \qquad (I)$$

The effective control-side area of the prior art diaphragm assembly ($A_{control}$) that is exposed to control pressure is equal to the area of control diaphragm (6) minus the effective area of piston (13) where $D_6$ is the diameter of the diaphragm (6) and $D_{13}$ is the diameter of the piston:

$$A_{control}=(D_6^2-D_{13}^2)*\pi/4 \qquad (II)$$

The effective area $A_{20}$ of the prior art valve plug (20) that is exposed to downstream liquid pressure at location (19) is expressed as:

$$A_{20} = D_{20}^2 * \pi / 4. \quad\quad\quad (III)$$

The force balance equation on the diaphragm assembly of the regulator valve of the prior art can be written as:

$$(P_{up} * A_{LS}) + (P_{down} * A_{20}) = (P_{control} * A_{control}). \quad\quad\quad (IV)$$

In equation IV, areas $A_{LS}$, $A_{20}$, and $A_{control}$ are constant. Pressure $P_{control}$, the regulated setpoint pressure, is constant. The variables then are the upstream liquid pressure $P_{up}$ (which one is trying to control) and the downstream liquid pressure in the lower valve body, $P_{down}$. At steady state, both $P_{up}$ and $P_{down}$ are constant, although the exact value of $P_{down}$ is unknown to the operator or an automated controller. Rearranging Eq. IV provides the equation:

$$P_{up} * D_5^2 - (P_{up} - P_{down}) * D_{20}^2 = (P_{control} * A_{control}) \quad\quad\quad (V)$$

Consequently, a change in the controlled pressure of the upstream liquid product requires a corresponding control pressure $P_{control}$ that is not proportional with the change in $P_{up}$. Adjusting upstream pressure $P_{up}$ requires a change in the positioning of valve member (20) to throttle up (or down) the flow of liquid through the orifice to maintain the $P_{up}$ setpoint. More importantly, when an incidental change in downstream liquid pressure $P_{down}$ occurs, the total pressure differential ($P_{up} - P_{down}$) across the regulator can cause a change in the liquid flow rate across the orifice. The change in liquid flow rate immediately affects the upstream pressure valve, $P_{up}$. Use of the prior art pressure regulator provides less system stability, a greater need for sophisticated control and feedback devices, and a greater variability in the upstream pressure $P_{up}$ which one is trying to control at a constant value.

A process system can also employ a pressure-reducing regulator. A pressure-reducing regulator typically controls the downstream liquid pressure (a liquid pressure building regulator controls the upstream pressure). A pressure-reducing regulator of the prior art has a configuration substantially identical to that of the prior art back pressure regulator shown in FIG. 10, except that the inlet-outlet ports are reversed, and the valve member (20) is on the opposite side of the orifice 21. In general, a change in the pressure of the flow inlet (upstream liquid pressure, $P_{up}$) should not affect the downstream pressure, which is under control. However, changes in the flow inlet pressure can affect the control of the pressure in the flow outlet (the downstream pressure, $P_{down}$) that is being controlled by the regulator. A sudden significant increase (or decrease) in inlet pressure would exert a greater (or lesser) force upon the lower face of the valve plug 20 that is transmitted to the diaphragm assembly. In the circumstance where there is no feedback control between the downstream pressure, $P_{down}$, exiting the regulator, an increase in the force exerted against face of the valve plug 20 causes the valve plug to move toward the closed position, which in turn reduces the liquid flow through the orifice, and reduces the effective liquid product pressure, $P_{down}$, in the outlet stream. The force balance equation for a pressure-reducing regulator is:

$$(P_{down} * A_{LS}) + (P_{up} * A_{20}) = (P_{control} * A_{control}). \quad\quad\quad (VI)$$

When the areas $A_{LS}$, $A_{20}$, and $A_{control}$ are constant, and the controller pressure $P_{control}$ is held constant, the equation V reduces to a disproportional relationship between $P_{down}$ and $P_{up}$:

$$P_{down} \approx K - P_{up}. \quad\quad\quad (VII)$$

Thus, when the upstream pressure increases, the controlled downstream pressure decreases. Without a separate feedback controller, $P_{down}$ decreases below its target setpoint $P'_{down}$. A feedback controller works by sensing the difference between the target setpoint pressure, $P'_{down}$, and the actual downstream pressure, $P_{down}$, and sending a corrective control signal to the control regulator. The corrective signal will increase the control pressure $P_{control}$, which in turn places greater force downstream on the diaphragm assembly, and causes the flow orifice to become more open. The opening of the flow orifice increases liquid flow through the orifice and increases the downstream pressure, $P_{down}$. The feedback controller can work well, but can take excessive time to arrive at the appropriate target liquid pressure. In some situations, frequent changes in the upstream pressure can prevent the feedback controller from reaching steady-state control of the downstream liquid pressure. Feedback control also requires additional equipment such as a pressure transmitter or transducer, and some type of control device, typically a PID controller or programmable logic controller.

Typical tactics to improve performance in conventional industrial-style pressure regulator valves are not typically suitable for use in sanitary valves For example, the pressure reducing valve of the prior art shown in U.S. Pat. No. 6,371,156 shows a typical pilot valve correction scheme used in regulating valves. The cleanability requirements of the sanitary industries can render this kind of valve render inappropriate for sanitary products since many of the valve features, such as the pilot lines 26 and 28 would be difficult to clean. Consequently, the sanitary industry has had a long-standing need for improved fluid regulating valves, and in particular for improved pneumatically-controlled pressure regulating devices, that meet sanitary standards and cleanable guidelines.

SUMMARY OF THE INVENTION

The present invention relates to a liquid pressure control valve comprising: a liquid housing defining a liquid flow passage having a first flow passage, a second flow passage, and an orifice means intermediate between and providing communication between the first flow passage and the second flow passage, the orifice means having an opening; a diaphragm assembly comprising a diaphragm having a liquid side forming a portion of the first flow passage, and an opposed control side, the diaphragm being moveable along a central axis; a control housing comprising a control means for applying a control force to the control side of the diaphragm; a valve plug positioned proximate the opening of the orifice means, and having a first side affixed to the liquid side of the diaphragm, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the second flow passage, where against a liquid in the second flow passage can exert a differential force against the diaphragm; a pressure receiving means in liquid communication with the second flow passage, upon which a liquid in the second flow passage can exert a balancing force; and a means for communicating the balancing force to the diaphragm opposing the differential force. The pressure control valve can be configured wherein the first flow passage is the flow inlet, the second flow passage is the flow outlet, and the valve plug is positioned on the flow inlet side of the orifice means, whereby the control valve provides pressure building control on the flow inlet. The pressure control valve can also be configured wherein the first flow passage is the flow outlet, the second flow passage is the flow inlet, and the valve plug is positioned on the flow inlet side of the orifice means, whereby the control valve provides pressure building control on the flow inlet.

The present invention also relates to a liquid pressure building valve comprising: a liquid housing defining a liquid flow passage having a flow inlet associated with a liquid inlet passage, a flow outlet associated with a liquid outlet passage, and an orifice means intermediate between and providing communication between the liquid inlet passage and the liquid outlet passage, the orifice means having an opening; a diaphragm assembly comprising a diaphragm having a liquid side forming a portion of the liquid inlet passage, and an opposed control side, the diaphragm being moveable along a central axis; a control housing comprising a control means for applying a control force to the control side of the diaphragm; a valve plug positioned on the liquid inlet passage side of the orifice means, and having a first side affixed to the liquid side of the diaphragm assembly, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the liquid outlet passage, where against a liquid in the liquid outlet passage can exert a backpressure force against the diaphragm; a pressure receiving means in liquid communication with the liquid outlet passage, upon which a liquid in the liquid outlet passage can exert a balancing force; and a means for communicating the balancing force to the diaphragm opposing the backpressure force.

The invention also relates to a liquid pressure reducing valve comprising: a liquid housing defining a liquid flow passage having a flow inlet associated with a liquid inlet passage, a flow outlet associated with a liquid outlet passage, and an orifice means intermediate between and providing communication between the liquid inlet passage and the liquid outlet passage, the orifice means having an opening; a diaphragm assembly comprising a diaphragm having a liquid side forming a portion of the liquid outlet passage, and an opposed control side, the diaphragm being moveable along a central axis; a control housing comprising a control means for applying a control force to the control side of the diaphragm; a valve plug positioned on the liquid inlet passage side of the orifice means, and having a first side affixed to the liquid side of the diaphragm, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the liquid inlet passage, where against a liquid in the liquid inlet passage can exert an overpressure force against the diaphragm; a pressure receiving means in liquid communication with the liquid inlet passage, upon which a liquid in the liquid inlet passage can exert a balancing force; and a means for communicating the balancing force to the diaphragm opposing the overpressure force.

The invention further relates to a differential diaphragm plate for use with a diaphragm assembly in a fluid control valve, the differential diaphragm plate having a rigid structure comprising a first side having a first surface area, and an opposed second side having a second surface area, wherein the first surface area and the second surface area are unequal.

The invention also relates to a fluid control valve comprising: a liquid housing having an opening defined by a margin, and having a flow inlet associated with a liquid inlet passage, a flow outlet associated with a liquid outlet passage, and an orifice means intermediate between the liquid inlet passage and the liquid outlet passage, and having an opening that provides liquid communication between the liquid inlet passage and the liquid outlet passage; a control housing having a margin; a diaphragm assembly positioned intermediate the liquid housing and the control housing, and comprising of a moveable differential diaphragm plate having a rigid structure, comprising a liquid side portion having a surface area, and an opposed control side portion having a surface area, wherein the liquid side surface area and the control side surface area are unequal, a flexible liquid-side diaphragm extending from a periphery of the fluid side portion of the plate to the margin of the fluid housing, thereby forming a liquid seal between the diaphragm plate and the fluid housing, and a flexible control side diaphragm extending from a periphery of the control side portion of the plate to the margin of the control housing, thereby forming a fluid seal between the diaphragm plate and the control housing; and a valve plug having a first side affixed to the fluid side of the moveable diaphragm plate, for movement of the valve plug along a common axis with the moveable diaphragm plate, to a position relative to the orifice means opening, whereby an orifice is formed between the orifice means opening and the valve plug, the orifice having a variable effective area as a function of the position of the valve plug.

The invention in addition relates to a fluid control valve comprising: a fluid housing having a margin, and having a flow inlet associated with a liquid inlet passage, a flow outlet associated with a liquid outlet passage, and an orifice means intermediate between and providing communication between the liquid inlet passage and the liquid outlet passage, the orifice means having an opening; a control housing; a diaphragm assembly having an outer periphery, and positioned intermediate the fluid housing and the control housing, comprising a moveable differential diaphragm plate having a rigid structure, comprising a fluid side portion having a surface area, and an opposed pneumatic side portion having a surface area, wherein the fluid side surface area and the pneumatic side second surface area are substantially unequal, and a liquid-impervious, fluid-side diaphragm extending outward from the fluid side portion of the plate to the outer periphery of the diaphragm assembly, and a vapor impervious, pneumatic-side diaphragm extending outward from the pneumatic side portion of the plate to the outer periphery of the diaphragm assembly; and a valve plug having a first side affixed to the fluid side of the moveable diaphragm plate, for movement of the valve plug along a common axis with the moveable diaphragm plate, to a position relative to the orifice means opening, whereby an orifice is formed between the orifice means opening and the valve plug, the orifice having a variable effective area as a function of the position of the valve plug.

The invention also relates to a system for cleaning a sanitary valve, comprising: a diaphragm assembly having a control side and an opposed product side; a sleeve position in the sanitary valve, having an axis that is aligned with an axis of the diaphragm assembly; a piston moveably positioned within the sleeve, the piston having a product side having attached thereto a shaft oriented along the axis and connected to the diaphragm assembly; a rolling seal positioned within the annular space between piston and the sleeve for providing a liquid seal; a first fluid pressure means for placing a force upon the control side of the diaphragm assembly; and a second fluid pressure means for placing a force upon the product side of the diaphragm assembly; wherein apply alternately the first and second fluid pressure means causes the piston to stroke in an alternating first and second direction, whereby when a cleaning solution is placed within the sanitary valve, the seal and the annular space are completely cleaned.

DETAILED DESCRIPTION OF THE INVENTION

Figure 1:
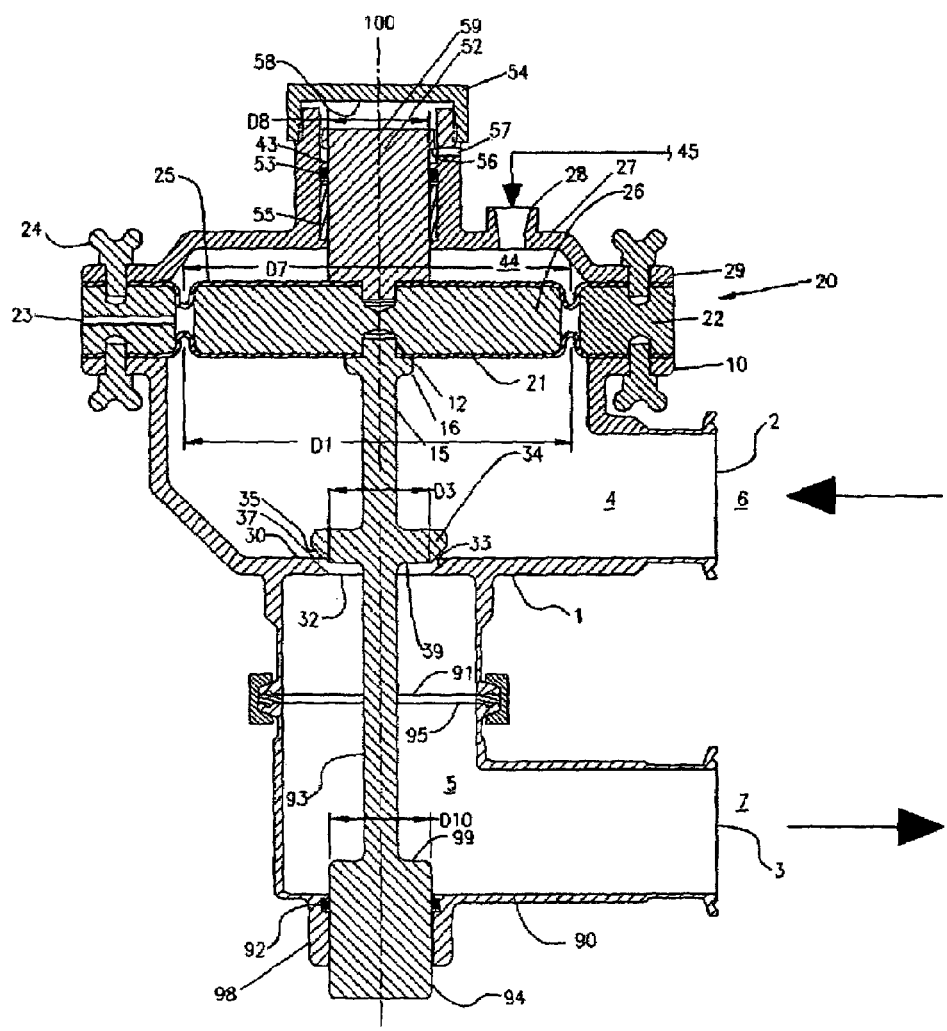
FIG. 1 is a cross-sectional view of a liquid pressure building regulator according to the invention with an axial balancing piston.

FIG. 1 shows a liquid pressure building regulator valve of the present invention. A liquid pressure building regulator can be characterized by its control of the liquid product pressure on the upstream (inlet) side. The means for controlling the liquid pressure (here, a diaphragm assembly 20) is in direct fluid communication with the upstream liquid side 6. The liquid pressure building regulator has a liquid housing 1 defining a liquid flow passage having a flow inlet 4 associated with a liquid inlet passage 2 and a flow outlet 5 associated with a liquid outlet passage 3. An orifice means 30 is positioned between the liquid inlet 4 and the liquid outlet 5. The orifice means 30 comprises a seat 33 that defines an opening 32 through which liquid communication is provided between the inlet 4 and the outlet 5. The orifice means 30 can permit, restrict, or shut off fluid flow, in response to the positioning of a valve plug 34, through a flow orifice 37 defined by the annular area between the valve seat 33 and a seating surface 35 of the valve plug 34. The movement of the valve plug 34 relative to the seat 33 provides an orifice 37 of variable effective area. The seating surface 35 is machined to mate with the seat 33 of the orifice means, to form a leak-resistant seal to the liquid product when the plug 34 is positioned firmly against the seat. While the plug 34 is shown in FIG. 1 with a bevel, the valve plug can also be configured as a skirted plug or tapered plug.

The inlet 2 and outlet 3 typically have sanitary connections such as sanitary clamps, with sanitary gaskets, and sanitary ferruled ends in order to connect the regulator to a piping system. Butt welded connections or sanitary bevel seated fittings which are well known in the sanitary industry are also possible variations for the connections.

The flow outlet 5 is provided by a second lower valve body 90 that is sealably connected at its inlet passage 95 to a liquid housing outlet passage 91 of the liquid housing 1.

The diaphragm assembly 20 comprises a liquid-contacting diaphragm 21 having a liquid side forming a portion of the liquid inlet 4, and an opposed side. The diaphragm 21 provides a seal between the liquid inlet and an actuator top 27. The diaphragm assembly 20 typically comprises a diaphragm plate 26 that is attached to and supports the liquid diaphragm 21. The diaphragm plate 26 shown in FIG. 1 comprises a rigid member that resists flexing in response to pressure or forces applied to either side of the diaphragm assembly. Preferably the diaphragm plate 26 is formed from a metallic material including, but not limited to, steel, austenitic stainless steels, super austenitic stainless steels, aluminum, cast iron, ductile iron, and alloys thereof; and plastic material, including but not limited to polyvinyl chloride (PVC), chlorinated polyvinyl chloride (CPVC), Polypropylene, Polystyrene, Hylar®, and Kynar®, and a combination thereof.

The diaphragm 21 is typically made of a flexible rubber or thermoplastic material. Typical diaphragm materials include, but are not limited to, nitrile, Teflon®, EPDM, and Viton®. The diaphragms can be reinforced using fabrics made of a material selected from, but not limited to, nylon, polyester, silk and Nomex®. A rolling diaphragm is more typically used than a flat or convoluted diaphragm, because it can maintain its effective cross-sectional area exposed to pressure through its entire stroke length.

The diaphragm assembly 20 is directly attached to the valve plug 34 via upper valve stem 15, whereby movement along a central axis 100 by the diaphragm assembly 20 causes a corresponding movement of valve plug 34 along axis 100. The position of valve plug seating surface 35 relative to seat 33 affects the open area of orifice 37. Preferably, the valve plug 34 and upper valve stem 15 are configured as a unitary member that is attached to the diaphragm plate 26 by threads or other well known means. The valve stem 15 can have a flange 16 positioned at the attachment end 12 that presses against the diaphragm 21 to form a sanitary seal to prevent liquid from leaking between the diaphragm 21 and the diaphragm plate 26.

The diaphragm assembly 20 further typically comprises an actuator ring 22 and a control fluid diaphragm 25. Actuator ring 22 serves as a spacing means and seal between a housing margin flange 10 of the liquid housing 1 and an actuator margin flange 29 of the actuator top 27. Typically each of the liquid diaphragm 21 and the control diaphragm 25 extend beyond the outer edge of the diaphragm plate 26, and onto and across the upper and lower surfaces of the actuator ring 22. The actuator top 27 and actuator ring 22 are held together by a securing means 24, typically a wing nut for field disassemble without the need for a mechanic's tool. Similar securing means also hold the housing margin 10 and actuator ring 22 together. The liquid diaphragm 21 is compressed between housing margin 10 and actuator ring 22, while the actuator top 25 and actuator ring 22 compress control fluid diaphragm 25, thereby sealing the margins 10 and 29.

The actuator ring 22 has a leakage passage 23 to allow either control fluid or product liquid to leak outside of the valve in case either diaphragm fails, in accordance with proper sanitary valve design.

Control diaphragm 25 and the interior surface of actuator top 27 define an enclosed space 44 into which a control means comprising a control fluid 45 can be confined. The control fluid enters the actuator top 27 via control fluid port 28. The confined, generally pressurized, control fluid 45 exerts a controlling force upon the control diaphragm 21 and the diaphragm plate 26. The force of the control fluid 45 on the control diaphragm 25, and the opposing force of the product liquid in the flow inlet 4 upon the liquid diaphragm 21, contributes to the positioning of the diaphragm assembly 20. The control fluid can be a hydraulic or pneumatic fluid, and is preferably a compressible gas, such as compressed air, that has a pressure supplied and controlled by an external compressed air regulator, or other pressure means, such as a transducer that can convert an electrical current (or voltage) signal to a pneumatic signal.

The actuator top 27 has an actuator shaft 52 that assists to guide the motion of the diaphragm plate and components connected thereto along axis 100. FIG. 1 shows a ledge 43 on the inside of the actuator top and a ledge 56 on the upper end of the actuator shaft 52 that cooperate as a stroke stop that can prevent the diaphragm plate 26 from over-stroking in the downward direction, which can cause diaphragm failure in either or both diaphragms 21 and 25. The stroke stop is more important on a pressure reducing regulator, such as one shown in FIG. 3, which cannot use the contact of the valve plug with its seat as a natural stroke stop. In the liquid pressure building regulator of FIG. 1, the stroke stop is usually redundant to the natural stop of the valve plug engaging the orifice seat 33. The actuator top 27 has a securably attachable cap 54 that has an inside surface 58 that serves as an up-stroke stop to prevent the diaphragm plate from over-stroking in the upward direction, which can cause diaphragm failure in either or both diaphragms 21 and 25. An o-ring 53 or similar seal forms a seal between the actuator top and the actuator shaft 52 to prevent control fluid from leaking out. A vent hole 57 prevents any excess pneumatic pressure from developing in the head space 59 above the actuator shaft 52 that would affect the force balance on the diaphragm assembly. The attached cap 54 is removable to allow the actuator shaft to be removed from the top. A guide bushing 55 helps to prevent the actuator shaft from binding to the actuator top.

The valve plug 34 has an opposing second side having a second surface 39 in liquid contact with the liquid in the flow outlet 5. As shown in FIG. 1, the second surface 39 has a diameter D3, and an annular area, termed $A_{39}$, directly exposed to the pressure of the liquid in the flow outlet. A lower valve stem 93 having a diameter $D_{93}$ shields the central portion of the second surface 39 of the valve plug from direct pressure, such that the annular area $A_{39}$ is expressed by:

$$A_{39}=(D3^2-D_{93}^2)\times\pi/4. \qquad (VIII)$$

The pressure of the liquid in flow outlet 5 exerts an upward force against the second surface 39 of the valve plug that is transferred to the liquid diaphragm assembly 20.

FIG. 1 shows a pressure receiving means comprising a balancing piston 94. The lower valve body 90 is configured with a piston flange 98 that accepts and guides the balancing piston 94 along central axis 100. A seal 92 forms a liquid seal between the balancing piston 94 and the piston flange 98, and can be an O-ring, diaphragm seal, or other sanitary sealing means.

The balancing piston 94 is typically made as a unitary piece with the lower valve stem 93 and the valve plug 34. Alternatively, the lower valve stem 93 can have a threaded end that engages a mating threaded bore in the second surface 39 of the valve plug 34, sealed in a sanitary fashion so that liquid product can not be held in the threaded areas. The balancing piston 94 comprises a first piston surface 99 in liquid contact with liquid in flow outlet 5. The first piston surface 99 has an outside diameter D10 and an annular area, termed $A_{99}$. The lower valve stem 93 shields the central portion of the first piston surface 99 of the balancing piston from direct pressure, such that the annular area $A_{99}$ directly exposed to the pressure of the product liquid in the flow outlet 5 is expressed by:

$$A_{99}=(D10^2-D_{93}^2)\times\pi/4. \qquad (IX)$$

During operation of the liquid pressure building regulator valve, the control means 40 a control fluid that exerts a controlled amount of pressure, or control pressure, onto the control side of the diaphragm assembly 20. The control pressure serves as input for building (controlling) product liquid pressure. The effective area, termed $A_{control}$, against which the control fluid exerts pressure against the diaphragm assembly 20, is expressed by:

$$A_{control}=(D7^2-D8^2)\times\pi/4, \qquad (X)$$

where D7 is the diameter of control diaphragm 25 and D8 is the diameter of actuator shaft 52.

The effective area, termed $A_{LS}$, against which the inlet liquid exerts pressure against the diaphragm assembly 20 is expressed by:

$$A_{LS}=(D1^2-D3^2)\times\pi/4, \qquad (XI)$$

where D1 is the diameter of the liquid contacting diaphragm 21 and D3 is the diameter of the valve plug second surface 39.

The force balance equation on the diaphragm assembly 20 of the liquid pressure building regulator valve of FIG. 1 can be written as:

$$(P_{up}\times A_{LS})+(P_{down}\times A_{39})-(P_{down}\times A_{99})=(P_{control}\times A_{control}), \qquad (XII)$$

where $P_{up}$ is the upstream pressure of the liquid in flow inlet 4, and $P_{down}$ is the downstream pressure of the liquid in flow outlet 5.

By constructing the balancing piston with an effective first piston surface area ($A_{99}$) equivalent to the effective area of the second surface of valve plug ($A_{39}$), the terms "$P_{down}\times A_{39}$" and "$P_{down}\times A_{99}$" cancel one another. In effect, the configuration of the liquid pressure building regulator valve of FIG. 1, employing a balancing piston, transforms pressure fluctuations in the flow outlet 5 into equal and opposite forces on the valve plug 34 and balancing piston 94, resulting in a net force of zero in the diaphragm plate 26. As a result, changes in the liquid pressure downstream of the valve plug only nominally, and typically negligibly, affect the upstream control of the liquid product. Canceling the last two terms on the left side of equation XII, the equation is reduced to:

$$P_{up} \times A_{LS} = P_{control} \times A_{control}. \quad \text{(XIII)}$$

In the embodiment shown in FIG. 1, the diameters D1 and D7 of the diaphragms 21 and 25 are equal. The diameter of the actuator shaft, D8, is configured to be equal to the diameter of the valve plug second surface 39, D3. Consequently, the effective liquid-side area, $A_{LS}$, and the effective control-side area, $A_{control}$, are equal. Equation XIII is simplified to:

$$P_{up} = P_{control}. \quad \text{(XIV)}$$

In this embodiment, the liquid product upstream pressure will be equal to the control pressure of the control fluid. Consequently, an operator of a process can more precisely control the upstream pressure (liquid building pressure) to a setpoint $P'_{up}$ by setting the control pressure $P_{control}$ to the same value. This eliminates or reduces guesswork. The balancing piston negates the effect of downstream liquid pressure, which can vary during operation, on the force balance of the diaphragm assembly. This improves the accuracy of the pressure control. Fluctuation in downstream product pressure will not exert a variable force on the diaphragm, and thus will not interfere with the control of the valve.

Figure 2:
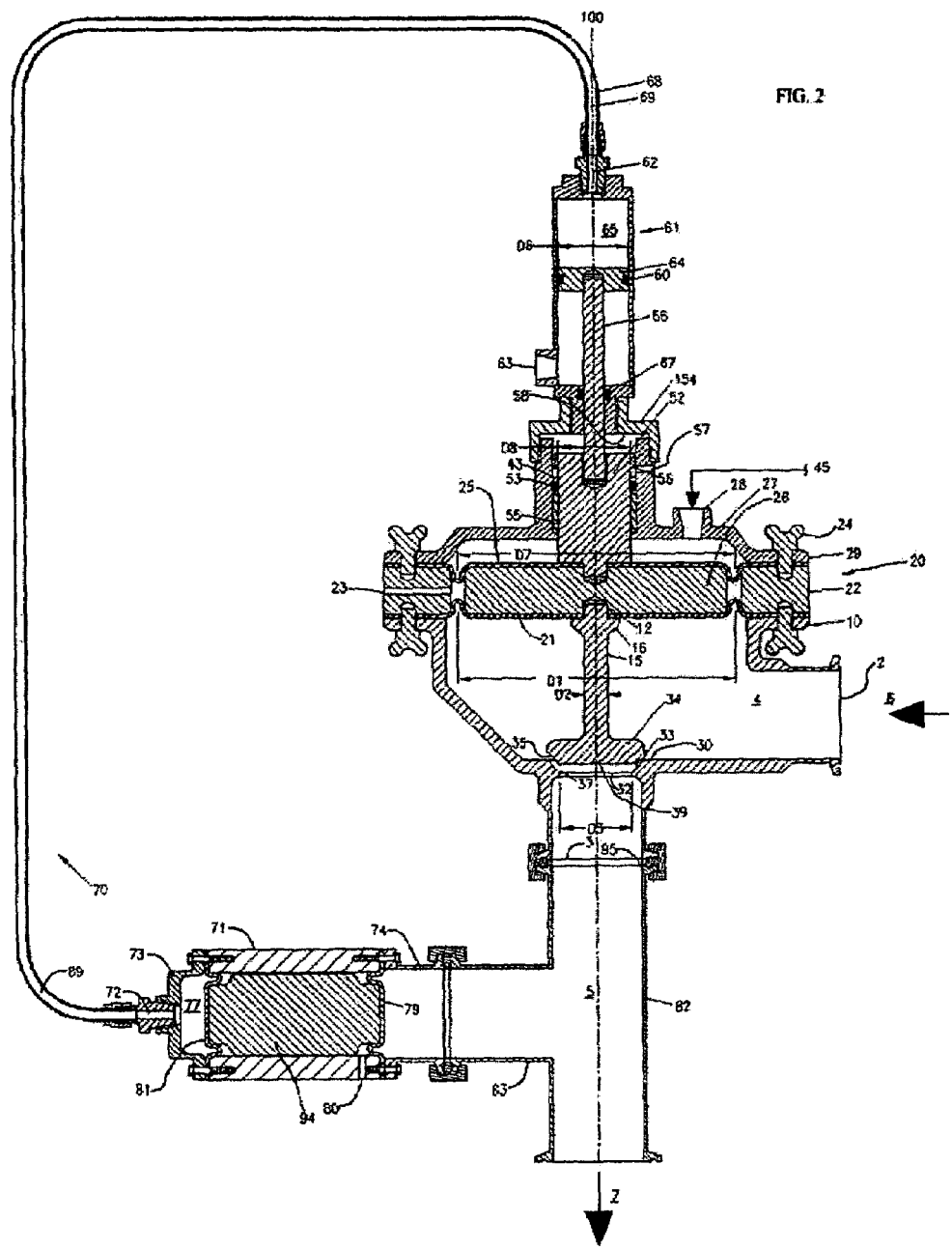
FIG. 2 is a cross-sectional view of a liquid pressure building regulator according to the invention with a non-integral balancing piston.

In another typical embodiment shown in FIG. 2, the liquid pressure building regulator valve comprises a balancing piston that is positioned further downstream from the valve plug 34, and is physically separated from the valve plug. FIG. 2 shows a liquid pressure building valve substantially the same as the one shown in FIG. 1. Numerical references in FIG. 2 identify similar elements as those in FIG. 1. The balancing piston 94 is positioned further away from the orifice 30 to minimize the effect of pressure recovery, discussed below. The balancing piston 94 has a first liquid side diaphragm 79, and an opposed second side diaphragm 81. The liquid product the flow outlet exerts upon first piston diaphragm 79 a force that is communicated by the balancing piston to the control side of the diaphragm assembly via a closed hydraulic system 70. Hydraulic system 70 comprises a cylinder 71 that connects at its first end to hydraulic tubing 68 and on its second end to the first end of a sanitary adapter 74. The opposed second end of the hydraulic tubing 68 is attached to an actuator cylinder 61. The sanitary adapter 74 is removably attached on a second end to a leg 83 of lower valve body 82. The liquid-side balancing diaphragm 79 extends outward toward and between the mating surfaces of the first end of the sanitary adapter 74 and the first end of the cylinder 71, to create a liquid seal. The liquid-side diaphragm 79 is exposed on its liquid side to the downstream liquid product in flow outlet 5, and is supported on the other side by the balancing piston 94. The balancing piston 94 is axially movable within cylinder 71, and supports on its second end the hydraulic diaphragm 81. The hydraulic diaphragm 81 extends outward toward and between mating surfaces of the first end of cylinder 71 and an open end of a hydraulic cover 73, to create there between a liquid seal. The hydraulic line 68 is sealably attached at its first end to a port coupling 72 in the hydraulic cover 73, and at its second end to a port coupling 62 in the actuator cylinder 61. The hydraulic fluid 69 is sealably contained within the hydraulic line 68, within the cavity 77 between hydraulic diaphragm 81 and hydraulic cover 73, and within the cavity 65 of the actuator cylinder above cylinder piston 64. All air or other compressible fluid is bled from the hydraulic system to ensure that the hydraulic fluid 69 is incompressible.

In operation, pressure in the downstream liquid of the outlet flow 5 exerts a force upon the liquid-side diaphragm 79. In response, the balancing piston 94 moves toward and exerts force upon the hydraulic-side diaphragm 81, until the forces on both sides of the balancing piston equilibrate. The force against the hydraulic side diaphragm generates hydraulic pressure in the hydraulic fluid 69 within the hydraulic cover 73, tubing 68, and the actuator cylinder. The pressure of the hydraulic fluid 69 contained within the cylinder cavity 65 exerts a downward force upon the upper surface of cylinder piston 64. The various forces exerted upon and by the hydraulic system are balanced (that is, the forces are equal and opposite). In an embodiment where the cross-sectional areas $A_{79}$ and $A_{81}$ of the liquid-side diaphragm 79 and hydraulic diaphragm 81, respectively, of the cylinder piston 64 are equal, the pressure of the downstream liquid product and the hydraulic fluid are equal. I rewrite equation XII for the embodiment of FIG. 2:

$$(P_{up} \times A_{LS}) + (P_{down} \times A_{39}) = (P_{control} \times A_{control}) + (P_{hydraulic} \times A_{64}), \quad \text{(XV)}$$

where $$A_{64} = D6^2 \times \pi/4. \quad \text{(XVI)}$$

The term "$P_{down} \times A_{39}$" is the backpressure effect on the diaphragm assembly. In order to cancel this term, the term "$P_{hydraulic} \times A_{64}$" is equal and opposite. Thus, $$(P_{down} \times A_{39}) = (P_{hydraulic} \times A_{64}). \quad \text{(XVII)}$$

Since the pressure of downstream liquid product and the pressure in the hydraulic system are equal, these forces cancel if the areas of second end 39 ($A_{39}$) and cylinder piston 64 ($A_{64}$) are equal.

Therefore in order to maintain a balance of forces upon the diaphragm assembly caused by the pressure of the downstream liquid, the areas $A_{79}$, $A_{39}$, $A_{81}$, and $A_{64}$ obey the following equation:

$$A_{79} = A_{39} \times (A_{81}/A_{64}). \quad \text{(XVIII)}$$

In this embodiment, the liquid-side piston diaphragm 79 can have an area suitable for any design such as sanitary standards. The difference in area of the liquid-side diaphragm 79 and the second surface 39 of the valve plug can be compensated for by adjusting the ratio of the area of the hydraulic-side diaphragm 81 and the cylinder piston 64.

The regulating valve arrangement shown in FIG. 2 offers flexibility in the arrangement and location of the balancing piston within the liquid piping system. The balancing piston can be located dozens or more pipe diameters downstream of the valve plug, where the pressure recovery fluctuations downstream of the valve have dampened, resulting in more stable control. Typically, the balancing piston is located at least about 1 pipe diameter, more typically at least about 2 pipe diameters, and even more typically about 5 to 10 pipe diameters, downstream of the orifice means 30.

A drain hole 80 in the balancing piston housing 71 allows for either liquid product or hydraulic fluid to leak from the housing in case either diaphragm 79 or 81, respectively, is breached.

Figure 6:
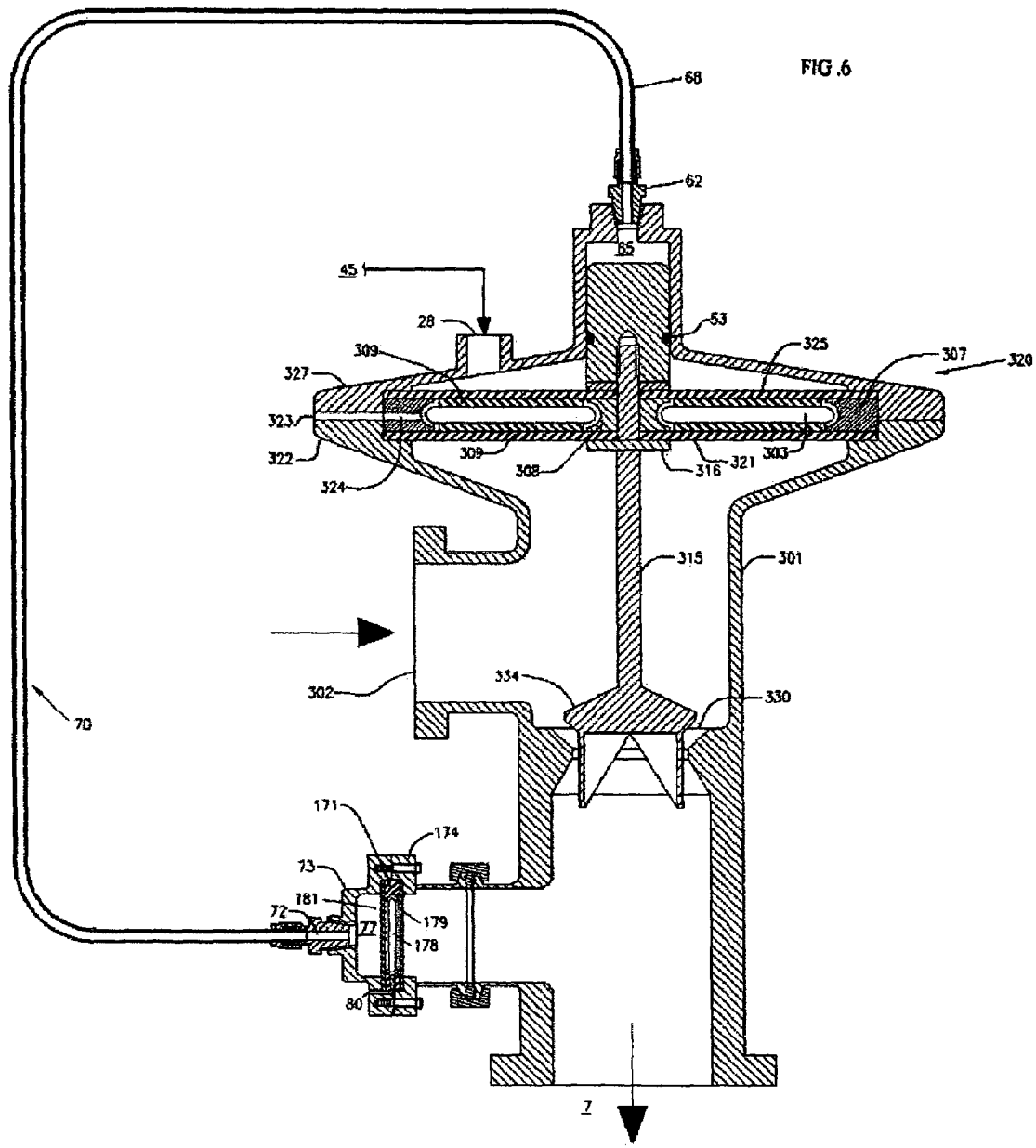
FIG. 6 is a cross-sectional view of a liquid pressure building regulator according to the invention with a non-integral balancing piston configured as a diaphragm.

An alternative embodiment of the present invention shown in FIG. 6 provide a liquid pressure building regulator having a balancing piston that comprises a disk 178 having a liquid diaphragm 179 and a hydraulic-side diaphragm 181. This embodiment operates otherwise as described for the embodiment shown in FIG. 2. In this embodiment, the hydraulic fluid 69 is typically a bacteria-static liquid, so that if diaphragm 179 fails, the hydraulic fluid 69 would not contaminate the product into which it contacts.

For many processes, the liquid building pressure setpoint can vary significantly; for example, from 10 to 500 psig (69 KPa to 3450 KPa). Conversely, many compressed control air regulators operate in a narrower range of pressures (e.g., from 2 psig (13.8 KPa) to 120 psig (827 KPa). If a process operates at a liquid building pressure of 400 psig (2757 KPa), it would be inconvenient, or at least more expensive, to provide a control air regulator and compressed air system that operates at such high pressures to match the liquid building pressure setpoint. Consequently, the present invention also provides a diaphragm assembly that has a difference in the effective areas of the liquid-side diaphragm and the control-side diaphragm. By doubling the effective area of the control side diaphragm ($A_{control}$) in equation XIII, the control pressure $P_{Control}$ can be made 50% of the desired upstream pressure $P_{up}$. The ratio of the control-side area ($A_{control}$) to the liquid-side area ($A_{LS}$) is termed the diaphragm ratio, $R_d$, where:

$$R_d = A_{control}/A_{LS}, \text{ or } R_d = A_{control} \cdot A_{LS} \quad \text{(XIX)}$$

Figure 5:
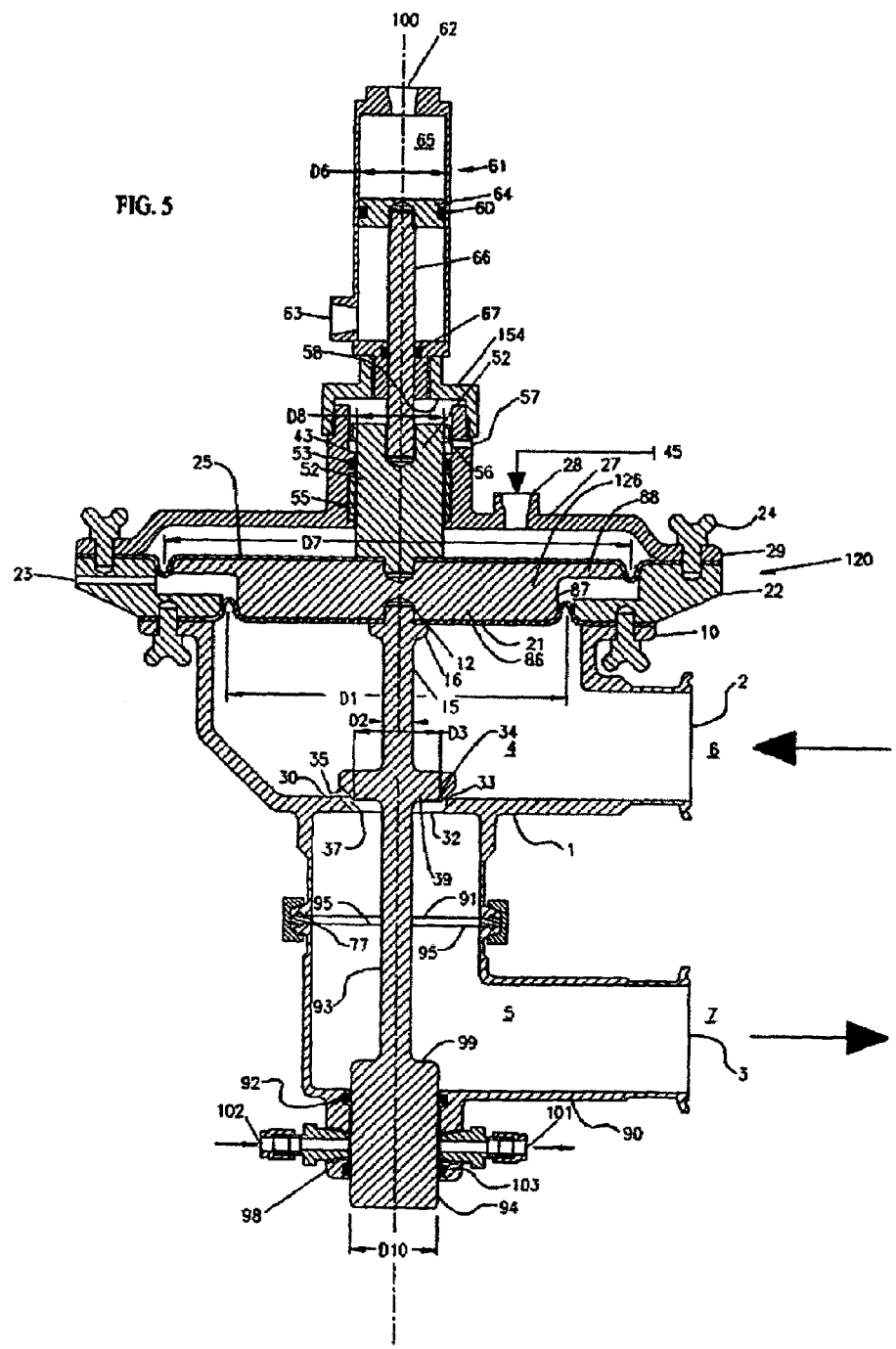
FIG. 5 is a cross-sectional view of a liquid pressure building regulator according to the invention with an axial balancing piston and differential diaphragm plate.

FIG. 5 shows a liquid pressure building regulator that is similar to the liquid pressure building regulator of FIG. 1, except that it has a differential diaphragm assembly 120 with a diaphragm ratio $R_d$ of greater than 1, and particularly of about 2. The differential diaphragm plate 126 comprises an upper portion 88 having a diameter, and a lower portion 86 having a diameter that is smaller than the diameter of the upper portion 88. The rise 87 of the lower portion 86 is configured to provide sufficient stroke for the diaphragm assembly 126 to freely operate the valve plug. Typically a differential diaphragm assembly has a diaphragm ratio in whole numbers, such as 2:1, 3:1, 4:1, 1:2, 1:3, and so forth, since it is easy to divide (or multiply) a given setpoint pressure by a whole number to determine the required control pressure setting. Diaphragm ratios of less than 1 are not typically required in industry, since conventional control pressure regulators are generally well suited for control of liquid product of low pressure.

The differential diaphragm plate permits the use of a conventional compressed air control regulator with the liquid pressure regulator to control a high pressure liquid system more accurately. For example, a differential diaphragm plate having a 4:1 diaphragm ratio can be used to control system liquid pressures at up to about 400 psig (2757 KPa) using a conventional compressed air control regulator having an controlled output range that covers up to 100 psig (690 KPa).

Embodiments having different ratios $R_d$ can be made by simply changing the size of several of the components. The actuator ring 22, control diaphragm 25 and actuator top 27 can be configured to accommodate the larger diameter of the upper portion 88 of the differential diaphragm plate 126.

The embodiment of FIG. 5 also has a means of sealing aseptically the balancing piston. Two o-rings 92 and 103 are spaced apart a distance greater than the maximum stroke length of the valve plug 94. Steam can be directed into and through the space between the o-rings. During operation any residual product that remains on the balancing piston 94 can be pulled into the same space. The live steam prevents bacterial growth within the residual product that could be pulled into the product area during normal stroking of the valve, particularly in the case of a worn seal. Typically live steam enters through port 10 and steam and condensate exits through port 101.

Figure 3:
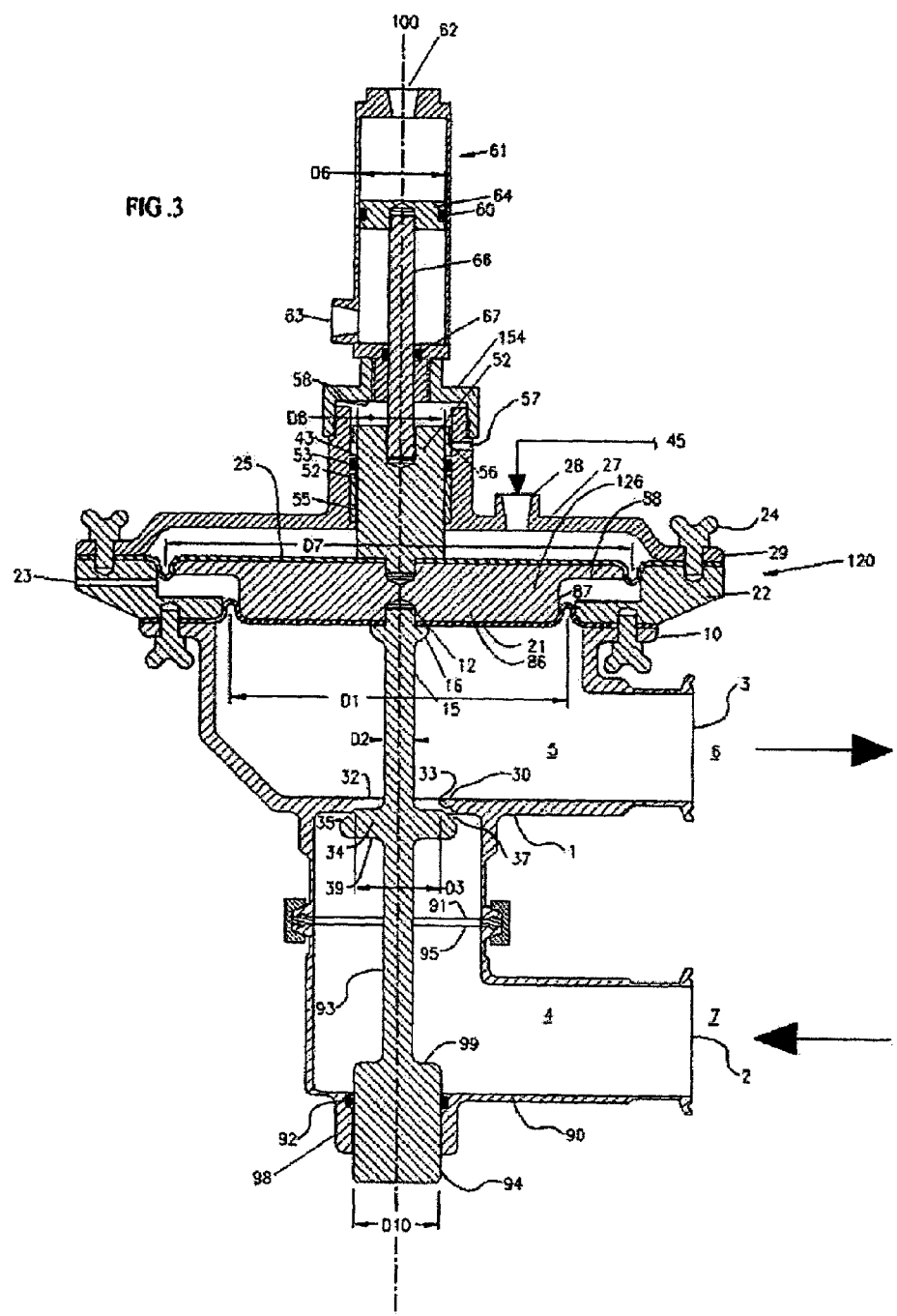
FIG. 3 is a cross-sectional view of a pressure-reducing regulator according to the invention having an axial balancing piston.

FIG. 3 shows a pressure-reducing regulator valve as another embodiment of the present invention. A pressure-reducing regulator can be characterized by its control of the liquid product pressure on the downstream outlet side 7. Here, the diaphragm assembly 20 that controls the liquid pressure has a diaphragm 21 in direct fluid communication with the flow outlet. In most respects the hardware elements of the pressure-reducing regulator of FIG. 3 are the same as those of the liquid pressure building regulator of FIG. 5, with the same numerical references identifying similar elements. The principle differences are the orientation of the valve seat 33 in the orifice means 30, and the location of the valve plug 34. In the pressure-reducing regulator of FIG. 3, the orifice means is configured so that the valve seat 33 faces away from the diaphragm assembly 120 and toward the liquid inlet 4. The valve plug 34 is positioned on the inlet flow side 4 of the orifice means 30, and on the opposite side of the orifice means 30 from the diaphragm assembly 120.

The use of a balancing piston 94 changes the force balance equation of a pressure-reducing regulator of the prior art (Eq. VI) by introducing a force vector on the balancing piston that is equal and opposite to the force exerted on the second surface 39 of the valve plug 34. The force balance equation for the pressure reducing regulator of FIG. 3 can be written as:

$$(P_{down} \times A_{LS}) + (P_{up} \times A_{39}) - (P_{up} \times A_{99}) = (P_{control} \times A_{control}). \quad \text{(XX)}$$

In the situation where the areas of the valve plug ($A_{39}$) and the balancing piston ($A_{99}$) exposed to upstream pressure ($P_{up}$) are equal and constant, the upstream pressure terms cancel, and the resulting force balance equation becomes:

$$P_{down} = P_{control} * (A_{control}/A_{LS}). \quad \text{(XXII)}$$

Where the area of the control diaphragm 25 ($A_{control}$) and the area of the liquid-side diaphragm ($A_{LS}$) are equal, the downstream liquid pressure is controlled to equal the control pressure applied to the control diaphragm. Any change in the upstream pressure will not affect the diaphragm position or the control of the downstream pressure. The use of the balancing piston enables a process control operator to easily set or adjust the control pressure of the pressure-reducing regulator, and allows the regulator to maintain a constant downstream liquid pressure without the need to adjust control settings for upstream pressure fluctuations.

Figure 4:
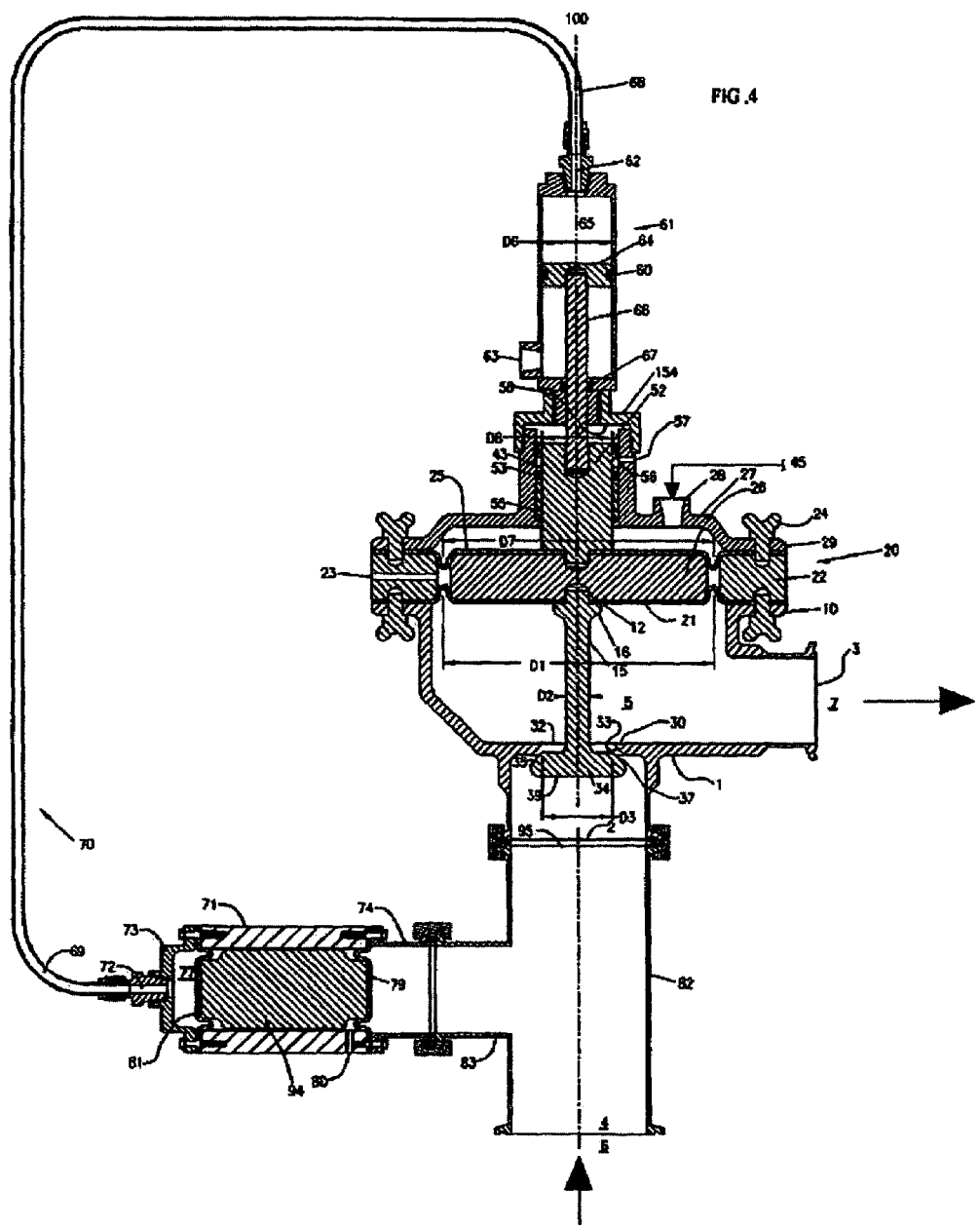
FIG. 4 is a cross-sectional view of a pressure-reducing regulator according to the invention with a non-integral balancing piston.

In another embodiment of a pressure-reducing regulator of the present invention, shown in FIG. 4, the regulator has a non-integral balancing piston. The configuration and operation of the non-integral balancing piston is similar to that of a liquid pressure building regulator as described above for FIG. 2. Although the pressure-reducing regulator in FIG. 4 is shown with a diaphragm plate 26 having a $R_d$ of about 1, a differential diaphragm plate can also be used as shown and described in FIG. 5 for a liquid pressure building regulator.

In another embodiment of the present invention, either the liquid pressure building regulator or the pressure reducing valve can comprise a means for lifting the valve plug 34 from the valve seat 33 so that cleaning solutions can freely run out of the valve during a cleaning operation. As shown in FIGS. 2, 5, 6, and 9, cylinder 61 has a lift port 63 that communicates with the cavity below cylinder piston 64. A lift fluid, supplied by a hydraulic or pneumatic source (not shown), under pressure, is introduced into lift port 63 via standard pipe fitting. During a cleaning operation, the lift fluid is pressurized within the cavity below piston 64, to raise upward piston 64 and diaphragm assembly attached thereto by cylinder shaft 66. This also raises valve plug 34 off its seat 33. With the valve plug raised in the full-up position, cleaning solution is passed through the liquid cavities of the valve to provide a thorough and complete cleaning of the valve and its internal liquid-side components, and complete draining of the cleaning solution from the valve afterward.

For the embodiments of pressure reducing valves shown in FIGS. 3 and 4, the valve is held open by applying a control pressure 45 to port 28 that is greater than the pressure of the cleaning solution. These embodiments illustrate another aspect of the invention, related to a system for cleaning a sanitary valve, comprising:

(1) a diaphragm assembly having a control side and an opposed product side,
(2) a sleeve position in the sanitary valve, having an axis that is aligned with an axis of the diaphragm assembly,
(3) a piston moveably positioned within the sleeve, the piston having a product side having attached thereto a shaft oriented along the axis and connected to the diaphragm assembly,
(4) a rolling seal positioned within the annular space between piston and the sleeve for providing a liquid seal,
(5) a first fluid pressure means for placing a force upon the control side of the diaphragm assembly, and
(6) a second fluid pressure means for placing a force upon the product side of the diaphragm assembly; wherein alternatively apply the first and second fluid pressure means causes the piston to stroke in an alternating first and second direction, and whereby when a cleaning solution is placed within the sanitary valve, the seal and the annular space are completely cleaned.

A thorough cleaning can be achieved by stroking the valve completely open and closed, so that the o-ring 92 and the entire wetted surface of the balancing piston 94 are exposed to the cleaning solution. The stroking is achieved by alternating compressed air loads onto port 63 and control pressure port 40. Any clean solution pressure also assists the upward force provided by air-loading port 63. The force exerted by the air loading on port 40 during cleaning must be greater than the force applied by the cleaning solution pressure to insure that the balancing plug 99 will stroke completely.

Cylinder 61 is attached typically by threads to the top of actuator cap 154. The cylinder shaft 66 rigidly attaches the cylinder piston 64 to actuator shaft 52 by threads. Seal 60 inhibits leakage of hydraulic fluid 65 past cylinder piston 64. The cylinder shaft 66 has a seal 67 to prevent leaking of lift fluid from cylinder 61 into actuator top 27.

In the pressure-reducing valve of FIG. 3, the differential diaphragm plate, the diaphragm ring 22, and the actuator top 27 are configured to provide a mechanical stop to prevent the diaphragm assembly from stroking the valve plug and balancing piston excessively in the downward direction. The more typical downward stroke stop is provided by ledge 56 of shaft 52 that can engage ledge 42 inside actuator top 27. A mechanical stop in the upward direction is created when upper edge of ledge 56 engages the lower surface 58 of cap 154.

In the embodiment of FIG. 6, the diaphragm assembly 320 comprises a control-side diaphragm 325, a liquid product-side diaphragm 321, and a flexible, segmented diaphragm support. The flexible diaphragm support comprises a plurality of annularly-arranged support segments 303. Each support segment is "pie"-shaped, and the plurality of segments lie in a plane between the two diaphragms 321 and 325. Each support segment 303 is pivotally secured at proximal edge by a stationary annular support ring 307, and is pivotally secured at a distal edge by a moving hub ring 308. The moving hub ring is secured to the shaft 315, whereby when the diaphragm moved axially, the distal edge of each support segment 303 moves with the hub ring 308. To enable the sector-formed support elements to freely pivot in the grooves of the two rings, the edges at the inner and outer ends of the support elements are preferably rounded off.

For manufacturing as well as operative reasons, each support segment 303 has a uniform thickness. When lying in a single common plane, the confronting edges of adjacent support segments are close to each other, separated by a space that gradually widens radially inward as the diaphragm attains a bulging position as the diaphragm assembly moves upward or downward. The stiff support elements 303 can be manufactured of any sufficiently stiff material. Thus, metallic material such as brass, bronze or stainless steel can be used, but also stiff plastic materials, especially plastics comprising reinforcing fibers such as glass fibers.

The diaphragm support also comprises a pair of spacer elements 309, one positioned between the liquid-side diaphragm 321 and the support segments 303, and the other positioned between the support segments 303 and the control diaphragm 325. The spacer elements 309 are preferably made of an elastic material to cooperate with the other parts of the diaphragm wall to form a combined damping system. Alternatively and preferably, diaphragms having projections on one of their sides can be mounted in direct contact with the support elements through said projections.

The annular support ring 307 is positioned and secured between the actuator top 327 and the valve margin flange 322. The support ring 307 has a drain port 324 extending outward and registering with a passage 323 formed at the joint of the valve housing flange 322 and the actuator top 327 to provide a means for detecting and draining any leakage of control fluid or product liquid into the space between the diaphragms 321 and 325.

Figure 7:
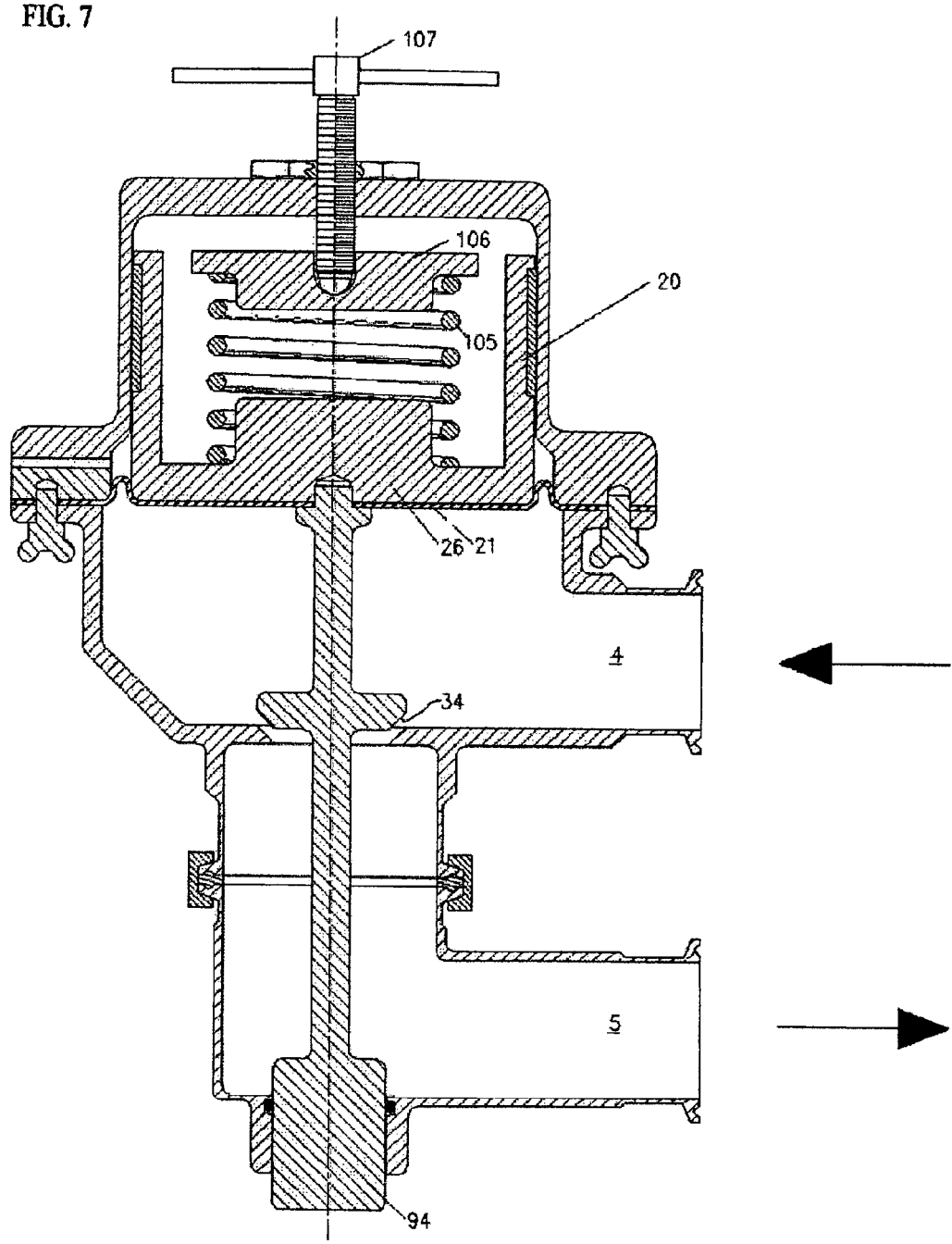
FIG. 7 is a cross-sectional view of a back pressure regulator according to the invention using a spring as a pressure control means.

Another embodiment of the invention is shown in FIG. 7, showing a liquid pressure building regulator having a balancing piston 94 and a spring 105 as a means to control the force applied to the control side of the diaphragm assembly 20. The amount of downward force exerted by the spring onto the diaphragm assembly is controlled by the positioning of spring cap 106 bearing down on the spring, by turning threaded handle 107. Such spring control means are well known in the art.

Figure 9:
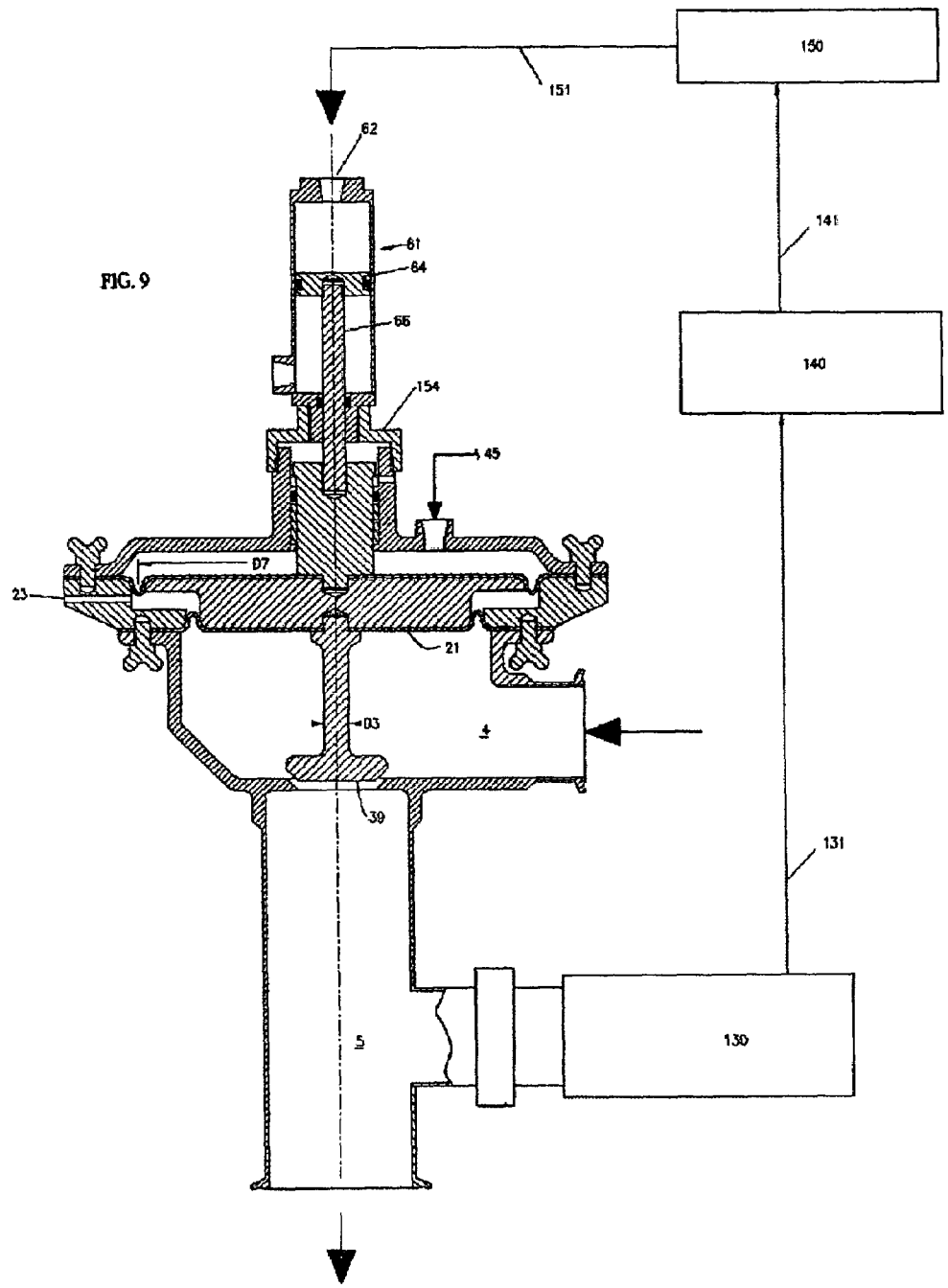
FIG. 9 is a cross-sectional view of liquid pressure building regulator according to the invention with a [feed forward correction scheme] as a pressure receiving means.
Figure 10:
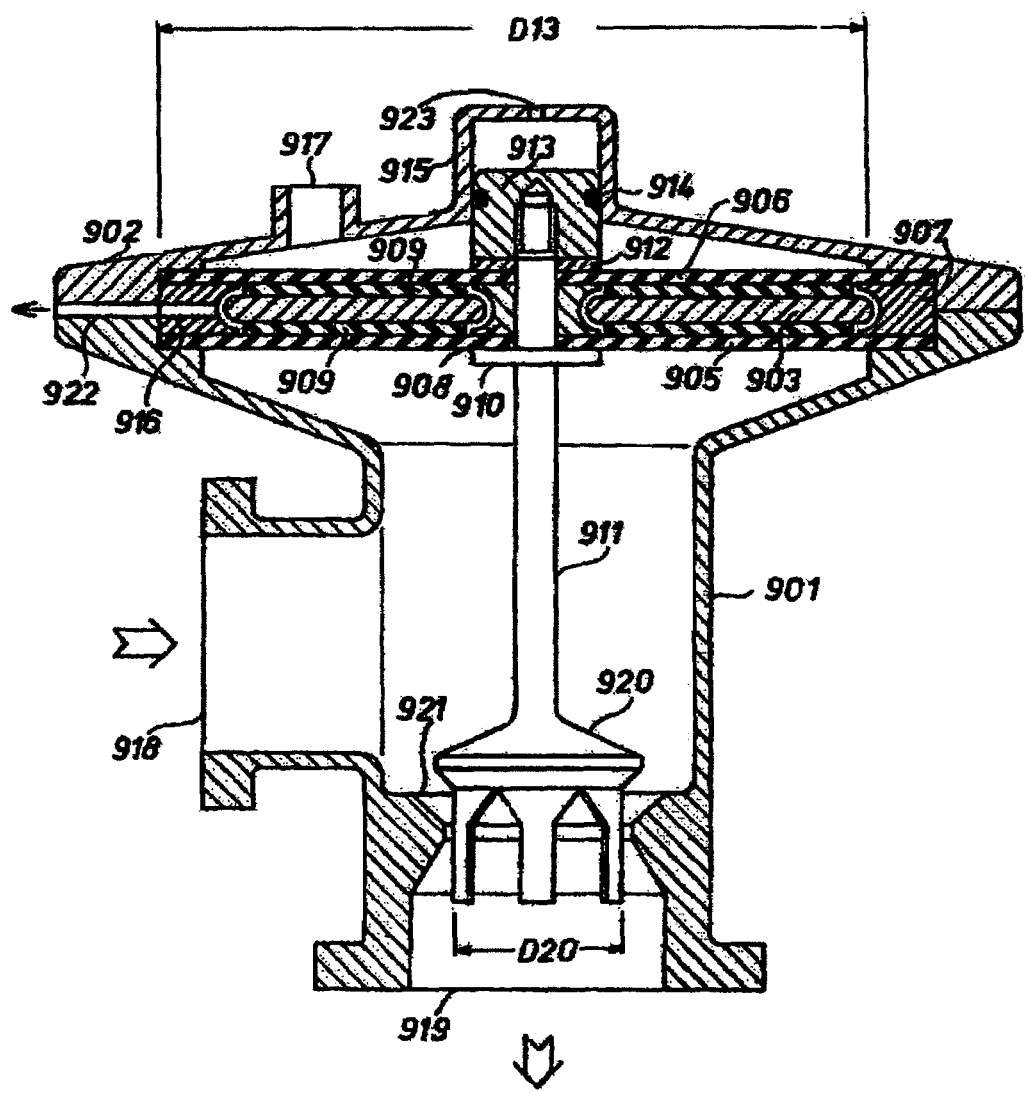
FIG. 10 is a cross-sectional view of a pressure regulator of the prior art.
Figure 11A:
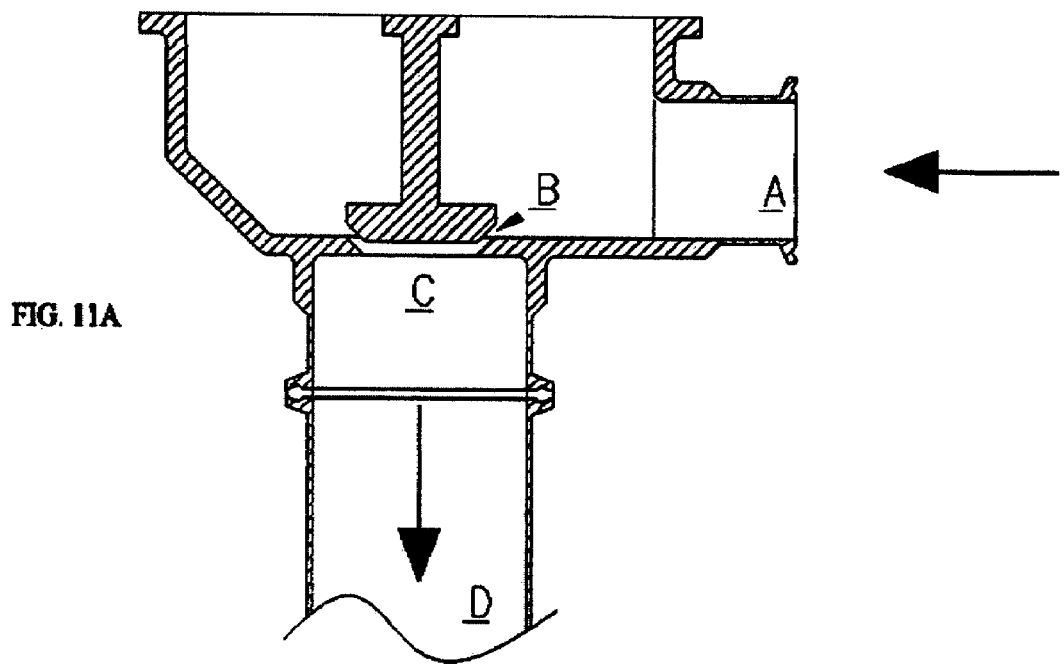
FIG. 11A is a cross-sectional view of a simplified pressure regulating valve of the prior art having a valve plug.
Figure 11B:
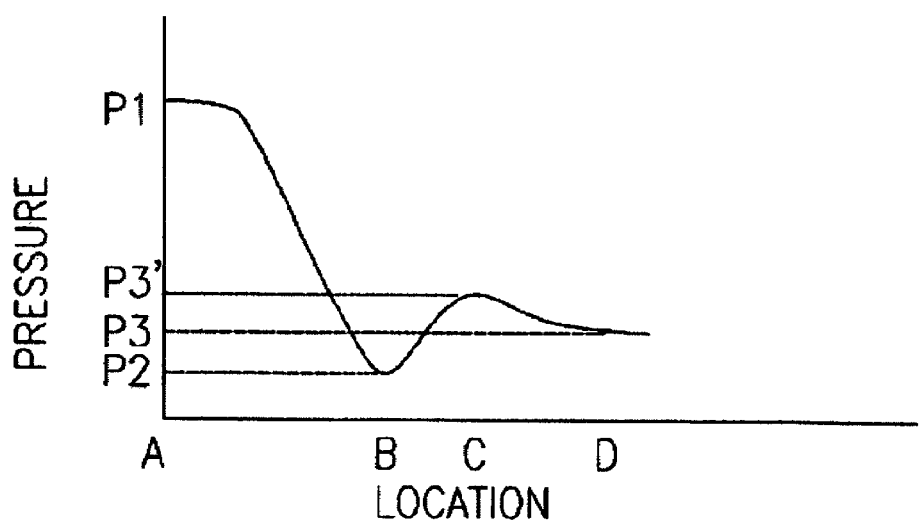
FIG. 11B is a diagram showing the liquid pressure profile during operation of the pressure regulating valve of FIG. 11A.

Yet another embodiment of the present invention, shown in FIG. 9, provides a pressure reducing valve comprising a feedback system, the feedback system comprising a pressure transmitter 130, an optional controller 140, and an electrical-to-pneumatic transducer 150. The pressure transmitter 130 is the pressure receiving means for the balancing force exerted by the upstream inlet liquid product that also exerts a force on the second surface 39 of the valve plug. The pressure transmitter converts the force of the liquid pressure into an electrical output signal that can be current or voltage.

The transducer 150 provides the means for communicating the balancing force to the diaphragm 26. The transducer 150 can be configured where the output signal 131 can be converted directly by the transducer 150 into a balancing pressure signal 151. The balancing pressure signal 151 is sent to actuator cylinder through port 62, and exerts a force on the diaphragm 26 via the cylinder piston 64.

Optionally, a controller 140 can receive the output signal 131 of the transmitter 130, and calculate an overpressure control signal 141 as an electrical value. The controller can calculate the overpressure control signal based on the area ($A_{64}$) of the cylinder piston 64 and the electrical units-to-pressure units conversion requirements of the transducer. The overpressure control signal 141 can be converted by the transducer 150 into the balancing pressure signal 151 suitable to balance the forces on the diaphragm.

The feedback system can be configured for use with a liquid pressure building regulator. In a liquid pressure building regulator, the control converts the output signal into a backpressure control signal.

Figure 8:
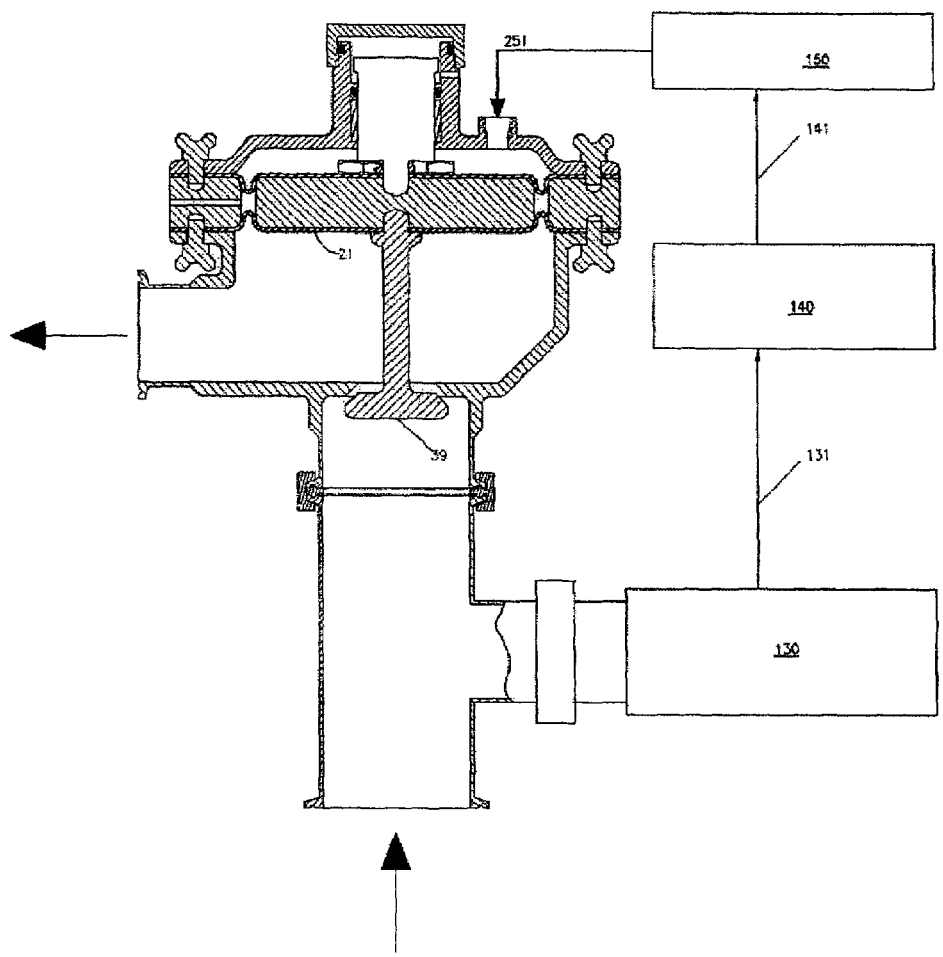
FIG. 8 is a cross-sectional view of a pressure reducing regulator according to the invention with a [feed forward correction scheme] as a pressure receiving means.

Yet still another embodiment of the present invention shown in FIG. 8 provides pressure reducing valve comprising a feedback/control system, the feedback/control system comprising a pressure transmitter 130, a controller 140, and an electrical-to-pneumatic transducer 150. The pressure transmitter 130 is the pressure receiving means for the balancing force exerted by the upstream inlet liquid product that also exerts a force on the second surface 39 of the valve plug. The pressure transmitter converts the force of the liquid pressure into an electrical output signal that can be current or voltage.

The controller 140 and transducer 150 provide the means for communicating the balancing force to the diaphragm 26. The controller 140 and transducer 150 also provide the control pressure ($P_{control}$) that is applied to the control diaphragm to control the reduced pressure setpoint of the outlet liquid product. The controller 140 receives the output signal 131 of the transmitter 130, and calculates an overpressure control signal as an electrical value. The controller calculates the overpressure control signal based on the area of the pneumatic diaphragm ($A_{25}$) and the conversion requirements of the transducer. The overpressure control signal can be converted by the transducer 150 into a balancing pressure signal suitable to balance the forces on the diaphragm. The controller 140 also calculates a liquid product control signal that is sent to the transducer. The liquid product control signal can be converted by the transducer 150 into a control pressure signal suitable to control the reducing pressure of the outlet liquid product. The controller 140 combines the overpressure control signal and the liquid product signal into a controller electrical signal 241 that is sent to the transducer 150. The transducer converts the combined controller signal 241 into a combined pneumatic signal 251 that is exerted upon the control diaphragm 25. The pneumatic signal 251, as a gauge pressure signal, comprises both the balancing pressure ($P_{balance}$), and the control pressure signal ($P_{control}$) needed to control the product outlet liquid at its desired reduced pressure setpoint.

The feedback/control system can be configured for use with a liquid pressure building regulator, as well as with regulators having differential diaphragm plates. In a liquid pressure building regulator, the control converts the output signal into a backpressure control signal.

I claim:

1. A liquid pressure sanitary control valve comprising:
    a liquid housing defining a liquid flow passage having a plurality of liquid-contacting surfaces comprising
        a first flow passage,
        a second flow passage, and
        an orifice means intermediate between and providing communication between the first flow passage and the second flow passage, the orifice means having an opening;
    wherein the liquid-contacting surfaces of the liquid housing are free from dead-legs or pockets, thereby enabling complete draining of liquid from the first and second flow passages after use and during cleaning,
    a diaphragm assembly comprising a diaphragm having a liquid side forming a portion of the first flow passage, and an opposed control side, the diaphragm being moveable along a central axis;
    a control housing comprising a control means for applying a control force to the control side of the diaphragm;
    a valve plug positioned proximate the opening of the orifice means, and having a first side affixed to the liquid side of the diaphragm, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the second flow passage, where against a liquid in the second flow passage can exert a differential force against the diaphragm;
    a pressure receiving means in liquid communication with the second flow passage, upon which a liquid in the second flow passage can exert a balancing force; and
    a means for communicating the balancing force to the diaphragm opposing the differential force.

2. The liquid pressure sanitary control valve according to claim 1, wherein the first flow passage is the flow inlet, the second flow passage is the flow outlet, the valve plug is positioned on the flow inlet side of the orifice means, whereby the liquid pressure sanitary control valve provides back pressure control on the flow inlet.

3. The liquid pressure sanitary control valve according to claim 1, wherein the first flow passage is the flow outlet, the second flow passage is the flow inlet, the valve plug is positioned on the flow inlet side of the orifice means, whereby the liquid pressure sanitary control valve provides pressure reducing control on the flow outlet.

4. A liquid pressure reducing sanitary valve comprising:
    a liquid housing defining a liquid flow passage having a plurality of liquid-contacting surfaces comprising
        a flow inlet associated with a liquid inlet passage,
        a flow outlet associated with a liquid outlet passage, and
        an orifice means intermediate between and providing communication between the liquid inlet passage and the liquid outlet passage, the orifice means having an opening;
    wherein the liquid-contacting surfaces of the liquid housing are free from dead-legs or pockets, thereby enabling complete draining of liquid from the first and second flow passages after use and during cleaning,
    a diaphragm assembly comprising a diaphragm having a liquid side forming a portion of the liquid outlet passage, and an opposed control side, the diaphragm being moveable along a central axis;
    a control housing comprising a control means for applying a control force to the control side of the diaphragm;
    a valve plug positioned on the liquid inlet passage side of the orifice means, and having a first side affixed to the liquid side of the diaphragm, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the liquid inlet passage, where against a liquid in the liquid inlet passage can exert an overpressure force against the diaphragm;
a pressure receiving means in liquid communication with the liquid inlet passage, upon which a liquid in the liquid inlet passage can exert a balancing force; and
a means for communicating the balancing force to the diaphragm opposing the overpressure force.

5. The liquid pressure reducing sanitary valve according to claim 4 wherein the balancing force is equivalent to and opposite the overpressure force.

6. The liquid pressure reducing sanitary valve according to claim 4 wherein the pressure receiving means comprises a balancing piston comprising a first surface in liquid communication with the liquid inlet passage, upon which the liquid in the liquid inlet passage can exert the balancing force.

7. The liquid pressure reducing sanitary valve according to claim 6, wherein the means for communicating the balancing force comprises affixing the first piston surface of the balancing piston to the opposed second side of the valve plug, whereby the balancing piston is movable along the central axis with the valve plug and the diaphragm.

8. The liquid pressure reducing sanitary valve according to claim 6 wherein the cross sectional area of the first piston surface is substantially equivalent to the cross sectional area of the second surface of the valve plug.

9. The liquid pressure reducing sanitary valve according to claim 6 wherein the means for communicating the balancing force comprises an enclosed hydraulic pressure system that communicates a hydraulic pressure between an opposed second piston surface of the balancing piston and an actuator cylinder, the actuator cylinder applying a force to the diaphragm opposing the overpressure force.

10. The liquid pressure reducing sanitary valve according to claim 4 wherein the control means comprises an opening in the control housing for applying a controlled pneumatic pressure onto the control side of the diaphragm.

11. The liquid pressure reducing sanitary valve according to claim 10 wherein the diaphragm comprises a rigid diaphragm plate having a liquid side surface having a surface area, and a control side surface having a surface area, wherein the liquid side surface area and the control side surface area are different in amount.

12. The liquid pressure reducing sanitary valve according to claim 11 wherein the control means comprises a mechanical spring controller.

13. The liquid pressure reducing sanitary valve according to claim 4 wherein the pressure receiving means comprises a pressure transmitter for transmitting an output signal, and the means for communicating the balancing force to the diaphragm comprises a transducer, wherein the transducer is configured to convert the output signal into a balancing pressure signal, and to transmit the balancing pressure signal as the balancing force to the diaphragm.

14. The liquid pressure reducing sanitary valve according to claim 13, further comprising a controller, wherein the controller is configured to receive the output signal, to convert the output signal into an overpressure control signal, and to transmit the overpressure control signal to the transducer, and wherein the transducer is configured to convert the overpressure control signal into the balancing pressure signal.

15. The liquid pressure reducing sanitary valve according to claim 14 wherein the controller is also configured to generate a liquid product control signal, and to transmit to the transducer a controller signal comprising the liquid product control signal and the overpressure control signal, and wherein the transducer is configured to receive the controller signal, and to convert the controller signal into a pressure signal comprising a balancing pressure signal and a control pressure signal.

16. A liquid pressure reducing sanitary valve comprising:
a liquid housing defining a liquid flow passage having
a flow inlet associated with a liquid inlet passage,
a flow outlet associated with a liquid outlet passage, and
an orifice means intermediate between and providing communication between the liquid inlet passage and the liquid outlet passage, the orifice means having an opening;
a diaphragm assembly comprising a diaphragm having a liquid side forming a portion of the liquid outlet passage, and an opposed control side, the diaphragm being moveable along a central axis;
a control housing having an opening through which can be applied a controlled pneumatic pressure onto the control side of the diaphragm, for applying a control force to the control side of the diaphragm;
a valve plug positioned on the liquid inlet passage side of the orifice means, and having a first side affixed to the liquid side of the diaphragm assembly, for movement of the valve plug along the central axis with the moveable diaphragm, to a position relative to the orifice means opening, whereby an orifice is formed between the orifice means opening and the valve plug, the orifice having a variable effective area as a function of the position of the valve plug, the valve plug having an opposed second side having a second surface in liquid communication with the liquid inlet passage, where against a liquid in the liquid inlet passage can exert an overpressure force against the diaphragm;
a pressure receiving means in liquid communication with the liquid inlet passage, upon which a liquid in the liquid inlet passage can exert a balancing force; and
a means for communicating the balancing force to the diaphragm opposing the overpressure force.

17. The liquid pressure reducing sanitary valve according to claim 16, wherein the pressure receiving means comprises a balancing piston comprising a first surface in liquid communication with the liquid inlet passage, upon which the liquid in the liquid inlet passage can exert the balancing force, and wherein the means for communicating the balancing force comprises affixing the first piston surface of the balancing piston to the opposed second side of the valve plug, whereby the balancing piston is movable along the central axis with the valve plug and the diaphragm.

18. The liquid pressure reducing valve according to claim 16, wherein the pressure receiving means comprises a balancing piston comprising a first surface in liquid communication with the liquid inlet passage, upon which the liquid in the liquid inlet passage can exert the balancing force, and wherein the means for communicating the balancing force comprises an enclosed hydraulic pressure system that communicates a hydraulic pressure between an opposed second piston surface of the balancing piston and an actuator cylinder, the actuator cylinder thereby applying a force to the diaphragm opposing the overpressure force.

19. The liquid pressure reducing sanitary valve according to claim 16, wherein the moveable diaphragm comprises a rigid diaphragm plate having a liquid side surface having a surface area, and a control side surface having a surface area different in amount from the liquid side surface area.

20. The liquid pressure reducing sanitary valve according to claim 16, wherein the pressure receiving means comprises a pressure transmitter for transmitting an output signal, and the means for communicating the balancing force to the diaphragm comprises a transducer, wherein the transducer is configured to convert the output signal into a balancing pressure signal, and further comprising a controller, wherein the controller is configured to receive the output signal, to convert the output signal into an overpressure control signal, and to transmit the overpressure control signal to the transducer, and wherein the transducer is configured to convert the overpressure control signal into the balancing pressure signal.

21. The liquid pressure reducing valve according to claim 16 wherein the controller is also configured to generate a liquid product control signal, and to transmit to the transducer a controller signal comprising the liquid product control signal and the overpressure control signal, and wherein the transducer is configured to receive the controller signal, and to convert the controller signal into a pressure signal comprising a balancing pressure signal and a control pressure signal.

* * * * *